United States Patent
Bartolini et al.

(10) Patent No.: US 8,088,186 B2
(45) Date of Patent: Jan. 3, 2012

(54) EQUIPMENT FOR THE ATOMISATION OF A LIQUID STREAM BY MEANS OF A DISPERSING GASEOUS STREAM AND FOR MIXING THE ATOMISED PRODUCT WITH A FURTHER SUITABLE GASEOUS STREAM IN EQUIPMENT FOR EFFECTING CATALYTIC PARTIAL OXIDATIONS AND RELATIVE CATALYTIC PARTIAL OXIDATION PROCESS

(75) Inventors: Andrea Bartolini, San Giuliano Milanese-Milan (IT); Luca Basini, Milan (IT); Giancarlo Lupi, Spino D'Adda-Cremona (IT)

(73) Assignee: ENI S.p.A., Rome (IT)

( * ) Notice: Subject to any disclaimer, the term of this patent is extended or adjusted under 35 U.S.C. 154(b) by 1307 days.

(21) Appl. No.: 11/574,773

(22) PCT Filed: Sep. 26, 2005

(86) PCT No.: PCT/EP2005/010574
§ 371 (c)(1),
(2), (4) Date: Mar. 6, 2007

(87) PCT Pub. No.: WO2006/034868
PCT Pub. Date: Apr. 6, 2006

(65) Prior Publication Data
US 2007/0278328 A1 Dec. 6, 2007

(30) Foreign Application Priority Data
Sep. 30, 2004 (IT) .................. MI2004A1860

(51) Int. Cl.
*B05B 7/04* (2006.01)
*B01J 8/02* (2006.01)
*C01B 3/22* (2006.01)
*C01B 3/24* (2006.01)
*C01B 3/26* (2006.01)

(52) U.S. Cl. ............. 48/197 R; 239/427; 252/373
(58) Field of Classification Search .......... 366/101, 366/107; 48/197 R; 252/373; 239/427
See application file for complete search history.

(56) References Cited

U.S. PATENT DOCUMENTS

| | | | |
|---|---|---|---|
| 3,071,540 A | | 1/1963 | McMahon et al. |
| 3,705,106 A | * | 12/1972 | Muzyczko et al. ......... 507/246 |
| 3,705,108 A | * | 12/1972 | Marion et al. ............ 252/373 |
| 3,847,564 A | * | 11/1974 | Marion et al. ............ 48/95 |
| 3,884,648 A | * | 5/1975 | Crouch ................ 48/197 R |
| 4,006,099 A | * | 2/1977 | Marion et al. ............ 252/373 |
| 4,006,100 A | * | 2/1977 | Crouch ................ 252/373 |
| 4,097,366 A | | 6/1978 | Tanaka et al. |

(Continued)

FOREIGN PATENT DOCUMENTS
DE 20 05 972 9/1971
(Continued)

*Primary Examiner* — Wayne Langel
(74) *Attorney, Agent, or Firm* — Oblon, Spivak, McClelland, Maier & Neustadt, L.L.P.

(57) ABSTRACT

Equipment for the atomization of a liquid stream by means of a dispersing gaseous stream and for mixing the atomised product with a further suitable gaseous stream, characterized in that it comprises: a feeding zone (A) equipped with means suitable for feeding the liquid stream, the gaseous dispersing stream and further gaseous stream; one or more two-stage atomization zones (N) of the liquid stream by means of the gaseous dispersing stream; a distribution zone (D) of the further gaseous stream.

24 Claims, 4 Drawing Sheets

U.S. PATENT DOCUMENTS

| | | | |
|---|---|---|---|
| 4,400,180 A * | 8/1983 | Marion et al. | 48/197 R |
| 4,443,230 A * | 4/1984 | Stellaccio | 48/197 R |
| 4,789,384 A * | 12/1988 | Martens et al. | 48/197 R |
| 4,888,031 A * | 12/1989 | Martens | 48/197 R |
| 4,946,475 A | 8/1990 | Lipp et al. | |
| 5,785,721 A * | 7/1998 | Brooker | 48/86 R |
| 5,935,489 A * | 8/1999 | Hershkowitz et al. | 252/373 |
| 5,962,606 A | 10/1999 | Williams et al. | |
| 6,001,938 A | 12/1999 | Chinh et al. | |
| 6,193,936 B1 | 2/2001 | Gardner et al. | |
| 6,713,036 B1 * | 3/2004 | Vanden Bussche et al. | 423/584 |
| 6,736,960 B1 | 5/2004 | Chen et al. | |
| 6,773,630 B2 * | 8/2004 | Stellaccio et al. | 252/373 |
| 6,872,379 B2 * | 3/2005 | Zahringer et al. | 423/651 |
| 7,399,329 B2 * | 7/2008 | Arcuri | 48/197 R |
| 7,785,491 B2 * | 8/2010 | Bedetti | 252/373 |

FOREIGN PATENT DOCUMENTS

| | | |
|---|---|---|
| EP | 0 593 171 | 4/1994 |
| EP | 1 095 904 | 5/2001 |
| FR | 1 460 594 | 3/1966 |
| WO | 93/19837 | 10/1993 |

\* cited by examiner

EQUIPMENT FOR THE ATOMISATION OF A LIQUID STREAM BY MEANS OF A DISPERSING GASEOUS STREAM AND FOR MIXING THE ATOMISED PRODUCT WITH A FURTHER SUITABLE GASEOUS STREAM IN EQUIPMENT FOR EFFECTING CATALYTIC PARTIAL OXIDATIONS AND RELATIVE CATALYTIC PARTIAL OXIDATION PROCESS

The present invention relates to equipment for the atomisation of liquid streams by means of a dispersing gaseous stream and for mixing the atomised product with a further gaseous stream.

SUMMARY OF THE INVENTION

The equipment claimed is used for feeding chemical reactors and is capable of mixing the atomised product and the gaseous stream in the space between the outlet of the equipment itself and the solid filling contained in the reactor.

The axial symmetry of the equipment makes it possible to extend this in the case of the feeding/mixing of several liquid streams.

In some chemical processes, for example in catalytic partial oxidation reactions of hydrocarbon charges, it is important to guarantee a fast and efficient dispersion of the liquid charge (for example naphtha, gas oil, deasphalted oil, etc.) and close contact with the reagents contained in a second phase (for ex. air, oxygen). If this requisite is not satisfied, various disadvantages can arise, among which a loss of selectivity to the desired products and the production of carbonaceous residues which, with time, make frequent running stoppages and internal cleaning of the reactor, necessary.

Knowledge acquired from FCC (Fluid Catalytic Cracking) technologies—which, as is well known from literature, have already dealt with and solved similar problems—has led to the above result.

It is not possible, on the other hand, to simply make use of FCC devices, as they do not include the co-feeding of a second reagent phase; they are in fact limited to the simple atomisation of a hydrocarbon charge inside a fluidised bed to give an atomised product having a suitable geometry.

The main mechanisms on which the functioning of FCC nozzles is based are (U.S. Pat. No. 5,289,976):
- Expansion through a slot or hole
- Mixing/expansion
- Shear/breaking atomisation through a hole in the form of a coil
- Impingement nozzle
- Breaking/mixing nozzle through high impact velocity.

Devices used in other technologies, such as diesel engine injectors and ultrasound atomizers have also been considered but it is held that they cannot achieve significantly higher performances with respect to FCC devices; in the case of diesel injectors, there is the problem of combining a pulse device with a reactor operating continuously, whereas in the case of ultrasound atomizers, problems arise due to the running of the atomising element. The present invention therefore combines a component deriving from FCC devices (for ex. those cited in U.S. Pat. No. 5,289,976, U.S. Pat. No. 6,257,504) with an additional component: in the particular case of catalytic partial oxidations, said second component is added with the purpose of uniformly mixing the phase containing the oxidizing agent (air/oxygen/nitrogen) with that containing the hydrocarbon.

DETAILED DESCRIPTION OF THE INVENTION

The equipment, the main object of the present invention, for atomising a liquid stream with a dispersing gaseous stream and mixing the atomised product with a further gaseous stream, is characterized in that it comprises:
- a feeding zone (A) equipped with means suitable for feeding the liquid stream, the gaseous dispersing stream and the further gaseous stream,
- one or more two-stage atomisation zones (N) of the liquid stream with the dispersing gaseous stream,
- a distribution zone (D) of the further gaseous stream, the first stage of the atomisation zone (N1) essentially consisting of a tubular core (2), preferably cylindrical, through which the liquid stream passes, equipped with a suitable series of nozzles (5), situated at the same height, and an external jacket (4) coaxial with said core, through which the gaseous dispersing stream passes, wherein said nozzles (5) allow the dispersing gaseous stream to enter the tubular core, perpendicular to the axis of said tubular core (2), causing a first atomisation of the liquid stream by means of "shear/breaking", the second stage of the atomisation zone (N2) essentially consisting of one or more nozzles (6), preferably one, connected at the bottom of the tubular core (2), parallel to the axis of said tubular core, in order to increase the atomisation degree, the distribution zone (D) essentially consisting of a further jacket (8), through which the further gaseous stream passes, external and coaxial to the jacket (4) of the first atomisation stage, and a series of nozzles (9), situated at the bottom of said further jacket, positioned at the same height, and parallel or inclined with an α angle lower than 40° with respect to the axis of the tubular core, preferably parallel or inclined with an α angle lower than or equal to 15°, more preferably inclined with an angle ranging from 5 to 100.

An element suitable for increasing the extent of the spurt emerging from the nozzle itself, can be installed close to the nozzles (9) of the distribution zone.

The nozzles (5) of the tubular core can preferably:
- be more than 2, symmetrically distributed among each other;
- be placed near the second atomisation stage;
- have a diameter ranging from 0.3 to 3 mm, more preferably from 0.5 to 1 mm.

The nozzles (9) of the distribution zone are preferably more than 2, symmetrically distributed between each other.

The nozzle(s) (6) of the second atomisation stage and the nozzles (9) of the distribution zone can be positioned at the same height or at different heights: arrangement at the same height is preferred.

A further object of the present invention relates to equipment for the catalytic partial oxidation of liquid fuels, characterized in that it comprises equipment for atomising liquid streams, as described above, according to the invention, and that it also comprises the following zones:

- a mixing zone (M), for mixing the atomised product, coming from the second stage of the atomisation zone, with a further gaseous stream, coming from the distribution zone, substantially consisting of an essentially empty chamber, with no internal elements;
- a reaction zone (R), consisting of a catalytic bed, having a constant or increasing section along the axis of the apparatus;
- a possible gas expansion zone (E) downstream with respect to the reaction zone.

The essentially empty chamber of the mixing zone is preferably of a cylindrical or truncated conical shape wherein the various spurts coming from both the distribution zone (D) and the second stage of the atomisation zone (N1), interpenetrate in the absence of gyrating motions.

Means having geometrical forms which are such as to minimize reflection phenomena of the atomised product can be preferably present, at least at the head of the catalytic bed, (so as to minimize reflection phenomena of the atomised product): in particular, monoliths with parallel channels can be used.

Furthermore, in the equipment according to the invention, mixing between the two reagent phases preferably takes place in the space between the outlet of the device and the inlet into the actual catalytic bed. The formation of gyrating motions in the equipment is deliberately minimized, as they can cause deposits of part of the feed on the reactor/feeder walls; experience has in fact demonstrated that said deposit can produce solid residues or other unbalances in the running of the equipment.

This problem is particularly important in the case of heavy hydrocarbons, having a final boiling point (>200° C.) significantly higher than the feeding temperature.

What is specified above should not be interpreted as a limitation of our invention as, by operating under suitable safety conditions, it is also possible to mix the two flows inside the equipment itself.

The advantages of said equipment are:

- Uniform atomisation over a period of time: suitable for feeding a continuous catalytic reactor.
- Fast and forced atomisation: to give an atomised product with suitable dimensions, minimizing side-reactions.
- Suitable for operating at high temperatures, thanks to the function of "heat insulator" of the gases which flow in the external and intermediate duct with respect to the hydrocarbon charge.
- Low pressure drops, thanks to the radial design/nozzle and the possible co-presence of liquid flash.
- Minimum mechanical impact on the catalyst surface: thanks to the solid-cone-shaped geometrical form of the effluent, the stream rate at the outlet of our device is moderate.
- Physical separation of the oxidizing and hydrocarbon phases inside the device, with a great advantage from a safety point of view.

Tests carried out on models of said distributor have shown great flexibility of use, scarce ties between liquid/gaseous charge, in addition to an easy start-up and shut-down. The scarce ties between liquid/gaseous charge are important when reactions such as that cited above are effected.

Figure 1:
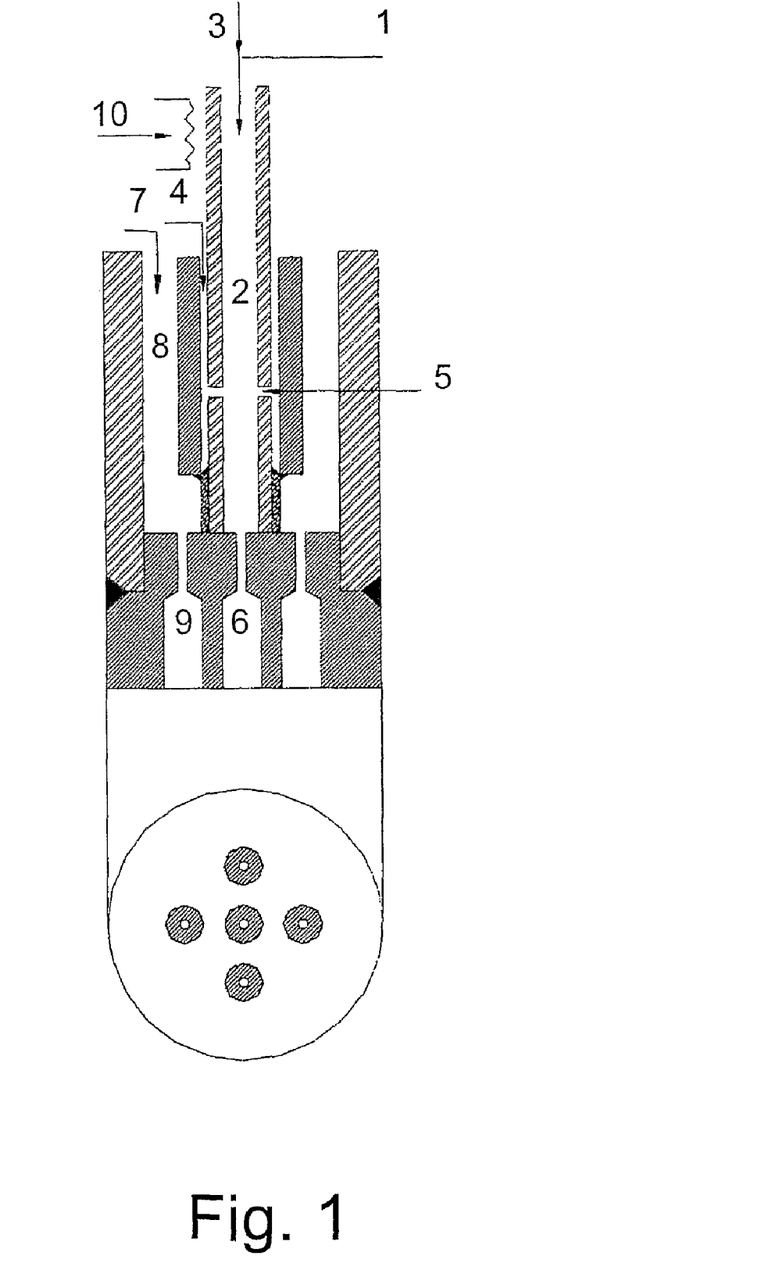
FIG. 1 is one embodiment of the present invention wherein the axis of nozzle 9 and 6 are parallel between each other and with respect to the axis of the equipment.

The assembly of the two elements preferably follows an axial symmetry, as shown in FIG. 1.

The atomisation stage of the hydrocarbon is based on a combination of atomisation mechanisms which allow the simple construction of equipment suitable for processing a wide range of flow rates: from small residential plants up to reactors such as those for catalytic partial oxidation.

Mechanisms such as expansion through a hole (U.S. Pat. No. 3,071,540) can be equally efficient, but, in the case of small flow rates, they require the use of holes with a small diameter, which can easily clog when heavy charges and/or containing suspensions are used.

A combination of one or more of these feeding devices can be used, depending on the type of reactor and its productivity; it is also possible to insert suitable additional elements with the purpose of obtaining a suitable geometry (normally solid cone) to the feeding stream.

It is possible, moreover, to add, at the head of the equipment of our invention, suitable heating elements, in order to appropriately moderate the interface stress and viscosity of the hydrocarbon charge, when the latter is particularly heavy.

Unlike what is normally stated in FCC literature, the nozzle of our invention mainly operates with a flow direction of the top-down type, even if it is not limited to this.

Claims can be found in literature of equipment similar to that present in FCC technologies (for ex. U.S. Pat. No. 4,195,779); the equipment claimed by us is different from those present in literature due to the design of the atomisation and mixing zone, which, in our case, is more suitable for treating heavy charges which can generate deposits along the walls of the mixing duct or obstruct holes with a particularly small diameter (small capacity plants).

We will now provide embodiments of the present inventions with the help of FIGS. 1, 2, 3 and 4, it being understood that these should not be considered as representing a limitation of the present invention.

FIG. 1 shows one of the configurations of the equipment according to the invention, in the particular case of a mixing between three different phases: liquid hydrocarbon/natural gas/water-air: further mixing levels can be added to the system, the axial symmetry of the whole section remaining unaltered.

With reference to FIG. 1, a charge of heavy hydrocarbon (LCO) is charged at the head of a SCT-CPO (Short Contact Time-Catalytic Partial Oxidation) reactor.

The liquid hydrocarbon charge (1) enters the feeding zone (A), from which, in the atomisation zone (N1), it passes through the main duct (the tubular core) (2), where it is mixed with water (3), whereas the dispersing gaseous stream (for ex. Methane, hydrogen, natural gas, off gas, etc.) enters the feeding zone (A), flows through the intermediate duct (external duct coaxial with the tubular core((4) of the atomisation zone (N1) and, passing through the series of nozzles (5) in an extern ⇒intern direction, it meets the liquid charge (1) causing a first atomisation. The atomisation degree proceeds further when the charge passes through the nozzle (6) of the second stage of the atomisation zone (N2), from where the charge enters the mixing zone (M) at the head of the reactor.

The second gaseous stream (7) enters the feeding zone (A) and the distribution zone (D) through the external duct (outer coaxial jacket) (8) to be distributed through the series of holes/nozzles (9). The spurts from the holes/nozzles (6), (9) combine to provide a good degree of overall mix.

In order to reduce the interface stress of the hydrocarbon, it is possible to add, at the head of the distributor, a suitably controlled heating element (10).

As far as the operating temperature is concerned, preferred use envisages maintaining, close to the tip of the distributor (6), (9), a temperature higher than that of the lower-boiling liquid (normally water); under these conditions, a complete vaporization of the low-boiling product is guaranteed, between the atomisation point (5) and the nozzle (6), which causes an improvement in the overall performances.

With respect to the running pressures, these mainly depend on the operating values of the reactor and on the pressure drops particularly associated with the passage through the holes/nozzles (59, (6); even if the atomisation degree of the liquid improves with a reduction in the nozzle diameter, the negative aspects of the greater pressure drops and possibility of the plugging of the nozzles due to impurities present in the liquid charge, are well known to experts in the field.

As far as the geometry of the outlet stream is concerned, this is approximately a solid cone, with an angle which depends on both the geometry of the outlets (6), (9) and on the flow rate values of the oxidizing stream/hydrocarbon stream.

Figure 2:
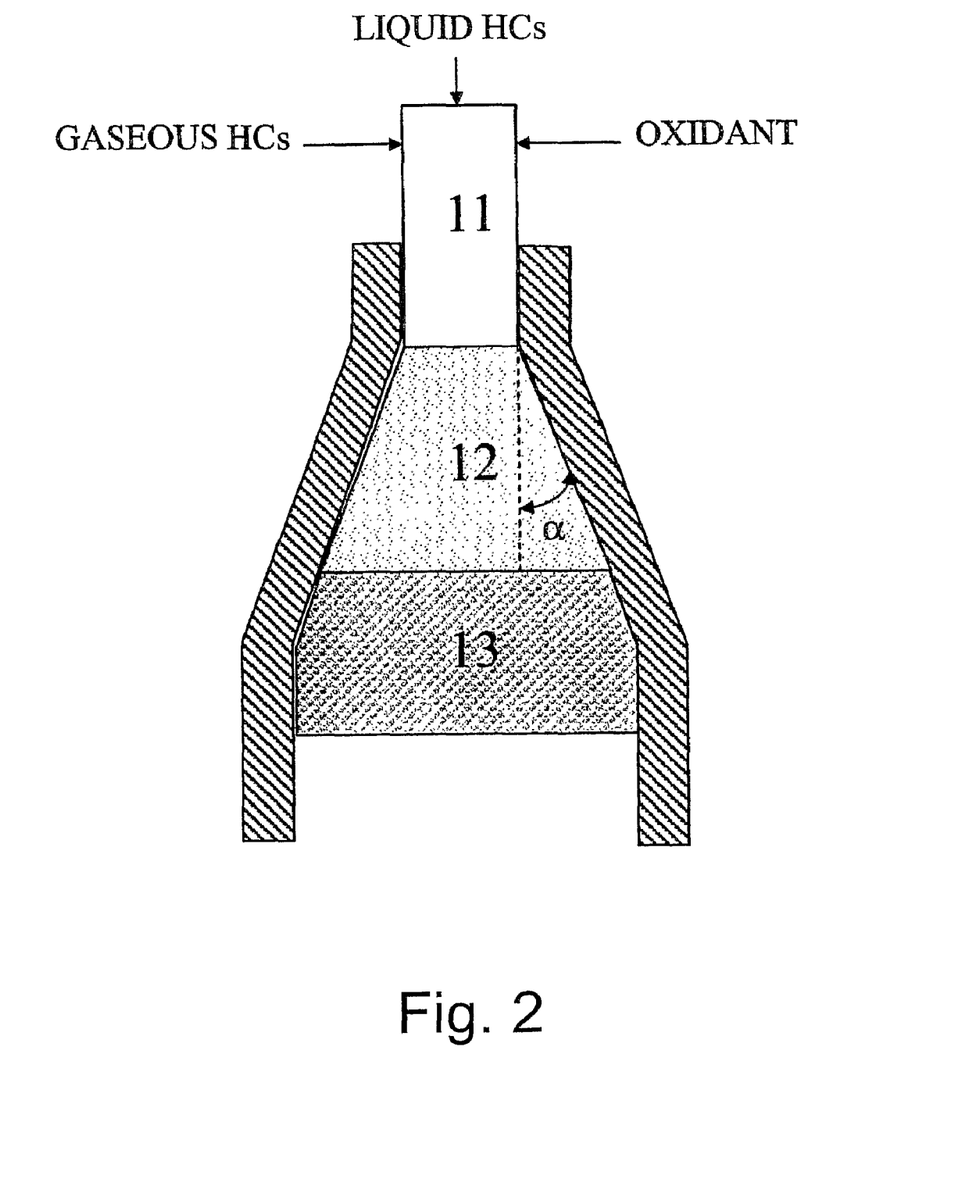
FIG. 2 shows the positioning of the present invention inside a reaction equipment wherein the inlet zone has a conical geometry.

FIG. 2 synthesizes a case of positioning the equipment inside a reactor and the geometry of the outlet streams from the equipment itself.

In FIG. 2 the mixer/atomizer (11) is positioned in the inlet (12) zone of a reactor for effecting catalytic partial oxidation reactions. The inlet zone (12) can have a conical geometry with an α angle ranging from 0 to 60°. The wall angle allows, in certain cases, the condensation of atomised hydrocarbons on the wall, to be reduced or avoided. The catalytic zone (13) below the inlet zone of the pre-mixed streams, can also have a truncated conical geometry to allow high inlet rates of the reagent mixtures and reduce the pressure drops due to the increase in the number of moles and the rise in temperature caused by the reactions.

Figure 3:
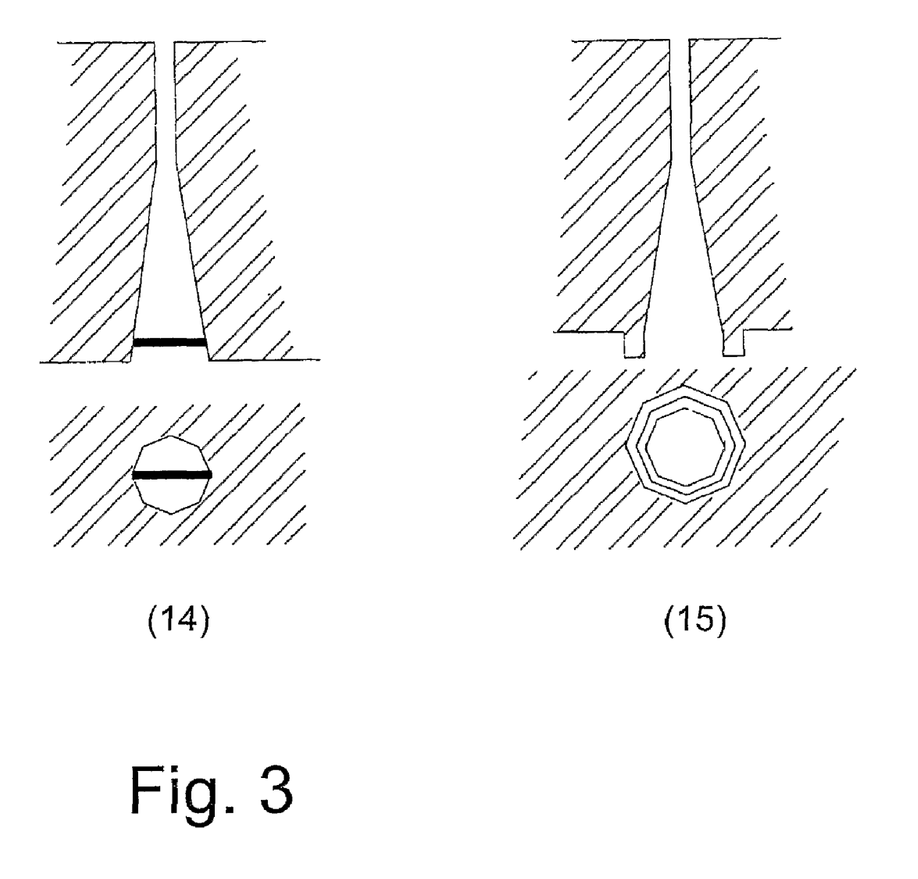
FIG. 3 shows two types of nozzles which can be used in the present invention wherein one nozzle has a pin (14) inserted at the outlet or a crenellated profile (15) of the outlet nozzle.

FIG. 3 shows other types of nozzles considered for the oxidizing phase: in these cases, the insertion of a pin (14) at the outlet or a crenellated profile (15) of the outlet nozzle, allows the geometry of the oxidizing spurt to expand and consequently to obtain a better interaction with the hydrocarbon phase.

It is preferable to apply these elements to the oxidizing gaseous stream rather than to the hydrocarbon stream, to minimize the formation of possible deposits of hydrocarbon in the line.

Figure 4:
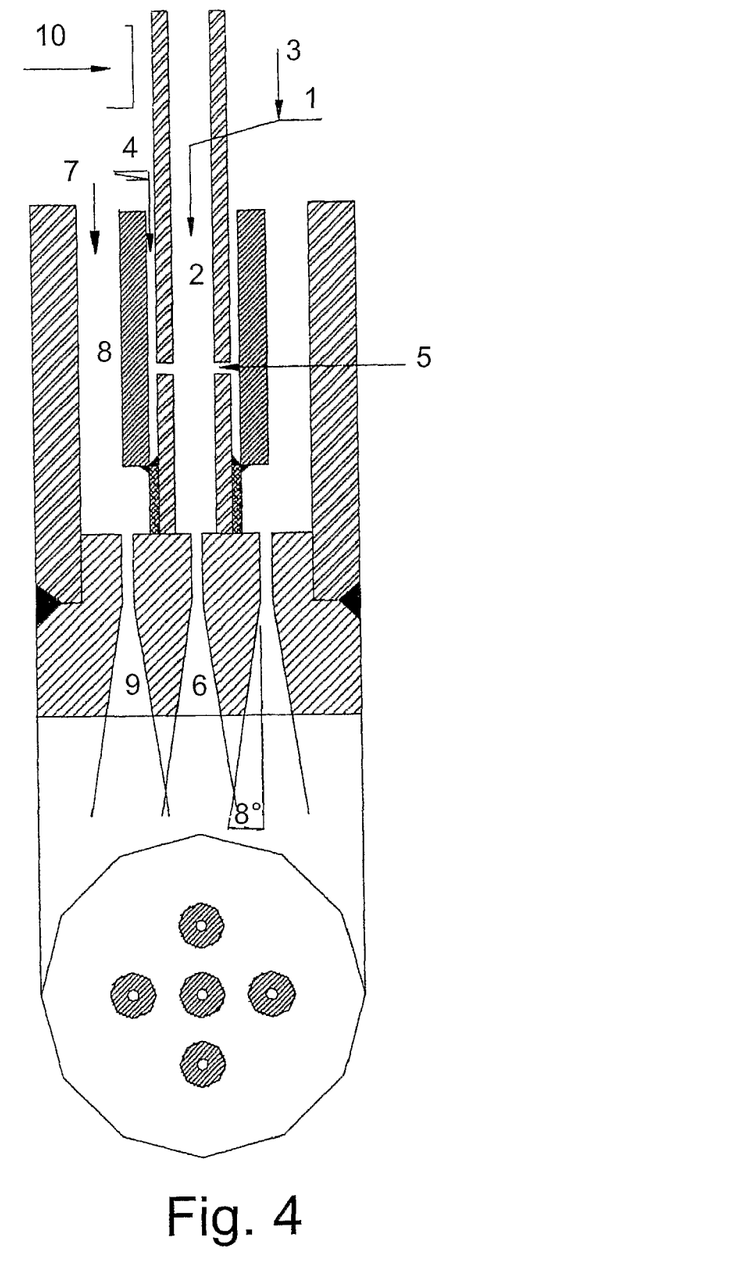
FIG. 4 is one embodiment of the present invention wherein the axis of nozzle 9 is inclined by 8° with respect to the axis of nozzle 6.

The outlet nozzles of the oxidizing phase can be suitably inclined to obtain a better interaction with the hydrocarbon phase as shown in FIG. 4, wherein the axis of nozzle 9 is inclined by 8° with respect to the axis of nozzle 6.

A further object of the present invention relates to the process for the catalytic partial oxidation of liquid hydrocarbon fuels, selected from gasoline, naphtha, medium distillates, deasphalted oils and heavy refinery residues and/or of oxygenated products, selected from methanol, DME and ethers, characterized in that it is effected by means of the equipment described above and in that it comprises the following steps:

- atomising the liquid fuels with a dispersing gaseous stream;
- pre-mixing and, at the start-up, pre-heating to temperatures ranging from 50 to 600° C., below the flammability values of the reagents consisting of liquid fuels, oxygen or air enriched with oxygen, possibly vapour and/or $CO_2$, so that the surface rate of the reaction gas is higher than the flame rate and the temperature of the reagents of the zone before the catalytic bed is below its flammability temperature;
- reacting, by the interaction of a suitable catalytic system, the reagent mix in the reaction zone, by triggering it at temperatures ranging from 150 to 600° C. and effecting it at space velocities ranging from 50,000 to 5,000,000 N1 reagents/L cat.×hr, reaching temperatures ranging from 600 to 1350° C.

The catalytic system preferably consists of oxides, nitrides or oxy-nitrides containing one or more elements selected from Rh, Ru, Ir, Pt, Ni, Fe, Co, Cr and Cu.

The element(s) contained in the oxides, nitrides or oxy-nitrides is preferably in a quantity ranging from 0.05 to 15% by weight.

The above-mentioned materials have generally shown a considerable resistance to thermal shock, particularly relevant under the activation conditions of the reaction. These properties have proved to be better than those of oxide materials used in OPC reactions. Moreover, said catalytic materials have shown an activity higher than, or equal to, that of the known materials.

The ratio between vapour moles/hydrocarbon carbon atom moles (steam/C) preferably ranges from 0 to 3.5, more preferably from 0.1 to 1.5, and the ratio between the molecular oxygen moles/hydrocarbon carbon atom moles ($O_2$/C) preferably ranges from 0.15 to 0.7, more preferably from 0.25 to 0.65.

The OPC processes according to the invention can, as mentioned above, be used as pre-reforming: in this case, the products obtained from the catalytic partial oxidation, effected between the reagents with an $O_2$/C volume ratio lower than 0.5, are sent to an autothermal reforming step.

EXAMPLES

Some examples are now provided, which should not be considered as representing a limitation of the present invention.

Example 1

Equipment made of AISI 316 with the dimensions shown in table 1, was tested by co-feeding water and nitrogen, according to the flow rates listed in table 2.

The liquid at the outlet of the device had fine dimensions, particles of relevant dimensions (0.3 mm) were absent.

The cone emerged with an angle (2θ) ranging from about 13 to 20°, depending on the atomisation gas flow rates.

TABLE 1 characteristics of the distributor

| | |
|---|---|
| Diameter of the internal duct | ⅛" |
| Diameter of the atomisation gas duct | ¼" |
| Diameter of the atomisation gas holes | 0.5 mm |
| Number of atomisation gas holes | 2 |
| Nozzle holes | 0.5 mm (internal)-2 mm (external) |
| Distance gas holes-nozzle | 8 mm |

TABLE 2 flow rates and geometry of the spurt (example 1)

| Water (1) (1/h) | Nitrogen (5) (N1/h) | Air (9) (N1/h) | Cone (2θ) | Notes |
|---|---|---|---|---|
| 0.42 | 650 | 0 | 14° | |
| 0.42 | 660 | 1000 | | |
| 0.36 | 660 | 990 | 18° | |
| 0.36 | 660 | 0 | 13° | |
| 0.60 | 450 | 0 | | |
| 0.60 | 360 | 0 | | Intermittent flow |

Example 2

Equipment differing from that of example 1 in a gas holes-nozzle distance equal to 15 mm, was tested under the same experimental conditions as example 1. The spray emitted was of a lower quality, showing a sporadic formation of drops having relevant dimensions.

Example 3

Equipment differing from that of example 1 in a diameter of the nitrogen holes equal to 0.4 mm instead of 0.5 mm, was tested under the same experimental conditions as example 1. A good quality spray was emitted.

Example 4

The same equipment as example 1 was tested inside a closed transparent container, capable of tolerating pressures of 8 bar.

A visual inspection showed a good atomisation degree in a pressure range varying from 1 to 7 bar, the gas flow rates (Nl/h) being maintained constant. The atomisation degree at 7 bar surprisingly appeared higher than that at 1 bar.

Example 5

The same equipment as example 4 was tested by co-feeding nitrogen from the external duct. The spray remained of a good quality and no canalisations were observed in the stream. The spurt remained homogeneous along the whole duct.

14. The equipment according to claim 13, wherein a further gas expansion zone (E) is present after the reaction zone.

15. The equipment according to claim 13, wherein means having geometrical forms which are such as to minimize reflection phenomena of the atomised product, are present at least at the head of the catalytic bed.

16. The equipment according to claim 15, wherein the means present at least at the head of the catalytic bed, are monoliths with parallel channels.

17. A process for the catalytic partial oxidation of liquid hydrocarbon fuels, selected from the group consisting of gasoline, naphtha, medium distillates, deasphalted oils, heavy refinery residues, and of oxygenated products, wherein said heavy refinery residues and oxygenated products comprise a material selected from the group consisting of methanol, DME and ethers, wherein said process is effected by means of the equipment according to claim 1, wherein said method comprises:
   atomising the liquid fuels with a dispersing gaseous stream;
   pre-mixing and, at the start-up, pre-heating to temperatures ranging from 50 to 600° C., below the flammability values, the reagents comprising liquid fuels, oxygen or air enriched with oxygen, possibly vapour and/or $CO_2$, so that the surface rate of the reaction gas is higher than the flame rate and the temperature of the reagent mix in the zone before the catalytic bed, is below its flammability temperature;
   reacting, by the interaction of a suitable catalytic system, the reagent mix in the reaction zone, by triggering it at temperatures ranging from 150 to 600° C. and effecting it at space velocities ranging from 50,000 to 5,000,000 Nl reagents/L cat.xhr, reaching temperatures ranging from 600 to 1350° C.

18. The process according to claim 17, wherein the catalytic system comprises nitrides or oxy-nitrides containing one or more elements selected from the group consisting of Rh, Ru, Ir, Pt, Ni, Fe, Co, Cr and Cu.

19. The process according to claim 17, wherein the catalytic system comprises oxides of one or more elements selected from the group consisting of Rh, Ru, Ir, Pt, Ni, Fe, Co, Cr and Cu.

20. The process according to claim 18, wherein the element (s) contained in the nitrides or oxy-nitrides is (are) in a quantity ranging from 0.05 to 15% by weight.

21. The process according to claim 17, wherein the reaction is triggered at temperatures ranging from 250 to 450° C., whereas the space velocities range from 150,000 to 5,000,000 Nl reagents/L cat.xh.

22. The process according to claim 17, wherein, among the reagents, the ratio between vapour moles/hydrocarbon carbon atom moles (steam/C) ranges from 0 to 3.5, and the ratio between the molecular oxygen moles/hydrocarbon carbon atom moles ($O_2$/C) ranges from 0.15 to 0.7.

23. The process according to claim 22, wherein the ratio between vapour moles/hydrocarbon carbon atom moles (steam/C) ranges from 0.1 to 1.5, and the ratio between the molecular oxygen moles/hydrocarbon carbon atom moles ($O_2$/C) ranges from 0.4 to 0.6.

24. The process according to claim 17, wherein the products obtained from the catalytic partial oxidation, effected between reagents with a $O_2$/C volume ratio lower than 0.5, are sent to an autothermal reforming step.

\* \* \* \* \*